(12) United States Patent
Moir

(10) Patent No.: US 8,189,176 B2
(45) Date of Patent: May 29, 2012

(54) VELOCITY DETECTOR

(76) Inventor: Christopher I. Moir, Malvern Wells (GB)

( * ) Notice: Subject to any disclaimer, the term of this patent is extended or adjusted under 35 U.S.C. 154(b) by 27 days.

(21) Appl. No.: 12/438,910

(22) PCT Filed: Aug. 24, 2007

(86) PCT No.: PCT/GB2007/003229
§ 371 (c)(1), (2), (4) Date: Oct. 30, 2009

(87) PCT Pub. No.: WO2008/023187
PCT Pub. Date: Feb. 28, 2008

(65) Prior Publication Data
US 2010/0045967 A1 Feb. 25, 2010

(30) Foreign Application Priority Data
Aug. 25, 2006 (GB) .................................. 0616838.9

(51) Int. Cl.
*G01P 3/36* (2006.01)
(52) U.S. Cl. ......... 356/28.5; 356/28; 356/305; 356/328; 356/488
(58) Field of Classification Search ........ 356/3.01–28.5, 356/139.01–139.1
See application file for complete search history.

(56) References Cited

U.S. PATENT DOCUMENTS

| | | | | |
|---|---|---|---|---|
| 3,706,494 A | * | 12/1972 | Gardner | ........................... 356/28 |
| 5,557,396 A | * | 9/1996 | Ishizuka et al. | ............... 356/28.5 |
| 5,557,407 A | | 9/1996 | Takamiya et al. | |
| 6,166,817 A | * | 12/2000 | Kuroda | ........................ 356/499 |

FOREIGN PATENT DOCUMENTS

EP 0 614 086 9/1994

OTHER PUBLICATIONS

International Search Report for International Application No. PCT/GB2007/003229 dated Feb. 4, 2008.
Examination Report in Canadian Application No. 2,661,560 dated Sep. 23, 2010.
Examination Report in European Application No. 07 789 316.2 dated Jul. 9, 2009.
Decision of Rejection in Chinese Application No. 200780031714.7 dated Jan. 10, 2011.
First Office Action in Chinese Application No. 200780031714.7 dated May 12, 2010.
Translation of Official Action in Russian Application No. 2009110889.
Official Action in Russian Application No. 2009110889 dated May 20, 2011.

* cited by examiner

*Primary Examiner* — Thomas Tarcza
*Assistant Examiner* — Luke Ratcliffe
(74) *Attorney, Agent, or Firm* — Marshall, Gerstein & Borun LLP

(57) ABSTRACT

A method of detecting the velocity of a moving object comprising the steps of: passing a beam of coherent light through an optical mask having a pattern of alternating opaque and non-opaque regions formed thereon, whereby an image of alternating light and dark fringes is projected along the length of the light beam; causing the moving object to pass through the projected image such that a portion of the light beam is reflected from the moving object as a series of pulses; detecting the reflected light pulses and the frequency of the pulses; and calculating the velocity of the object as a function of the pulse frequency and the known separation of the fringes of the image.

15 Claims, 2 Drawing Sheets

VELOCITY DETECTOR

FIELD OF THE INVENTION

This invention relates to a velocity detector for measuring the velocity of an object passing through a defined field of view.

BACKGROUND TO THE INVENTION

In the prior art a technique known as Laser Doppler Velocimetry ("LDV") uses the coherent nature of laser light to focus two crossing laser beams with identical polarisation at a single reference point, thereby creating linear and regularly spaced interference fringes within a defined measurement volume. An object passing through the measurement volume will reflect incident light from the fringes back to a detector via a lens system and produce a signal that can be interpreted to deliver the velocity of the object. The signal frequency will relate to the fringe spacing and the velocity of the object. For precision laser beam geometry, fringe spacing is highly regular, allowing accurate velocity measurements to be made. An instrument using this technique is commonly known as a Velocimeter.

For two laser beams emerging from the final focussing lens of a velocimeter at spacing L and each having a beam diameter $\delta$, and where $\Pi$ is the mathematical constant Pi (3.14159 ...), the number of fringes N generated in the measurement volume at the crossing point of the two beams is given by the formula:

$$N=4/\Pi*L/\delta$$

For laser beams of wavelength $\lambda$ and a focusing lens of focal length f, the diameter D of the measurement volume is given by the formula:

$$D=4/\Pi*\lambda f/\delta$$

It will be appreciated by those skilled in the art that a focused laser beam forms a 'beam waist' at the point of focus of finite diameter D and length.

As an example, and to illustrate the later discussion, consider a focusing lens of focal length of 250 mm and a pair of laser beams with a beam spacing of 45 mm, beam diameter of 2 mm and a wavelength $\lambda=780$ nm. The number of fringes N and the measurement volume diameter D are thus:

| | |
|---|---|
| N = 4/$\Pi$ * L/$\delta$ | D = 4/$\Pi$ * $\lambda$f/$\delta$ |
| N = 1.273 * 45/2.0 | D = 1.273 * 780 * $10^{-9}$ * 250/2.0 |
| N = 28 fringes | D = 124 microns |

This gives a fringe spacing in the measurement volume of D/N=4.4 microns.

The orientation of the fringes in relation to a given polarisation axis of the laser beams is fixed, such orientation being a function of the interference effect which creates the fringes.

If the two laser beams do not cross precisely at their focus (known as the "beam waist"), the geometric regularity of the fringes will be compromised, and the fringe spacing will vary throughout the length of the measurement volume. An object travelling at a constant velocity will therefore create different frequencies as it passes through different parts of the measurement volume, an undesirable effect. In the above example, the measurement volume length will be less than 1 mm, and the manufacturing precision of the lenses and optical components used in the velocimeter must of necessity be of a very high standard (and therefore expensive) to achieve consistency of fringe spacing.

Using the above example, an object passing through the measurement volume will produce a signal with a velocity constant Fout determined by $$Fout=N/D$$

$$Fout=0.227*10^6 \text{ Hz/meters/second}$$

As velocimetry can be used to measure the velocity of high speed particles with very small sizes (sometimes having submicron diameters), the sensitivity of the detectors used must be high, as the amount of light scattered by the particle as it passes through a fringe will be small. In order to measure high velocities, the bandwidth of the detectors used must also be high. The gain-bandwidth product of the detector will therefore be high, increasing the cost. In a limiting case, the cost of the detector required might be so high as to render the use of velocimetry uneconomic for some applications.

Again in the above example, a detector with sufficient sensitivity to measure (say) high speed smoke and debris efflux in the 1-3 micron diameter range from a small rocket motor might only have a bandwidth of 10 MHz. The maximum velocity capable of being measured would therefore be 10/0.227=44 meters/second. However, combustion efflux velocities can easily reach several hundred meters/second, and for very powerful rockets, velocities of several thousand meters/second can be encountered. The bandwidth limitation would not allow the instrument to be used.

As the direction of the passing object relative to the velocimeter might vary, or in some circumstances might not be known, it may be necessary to rotate the entire velocimeter to ensure that the orientation of the fringes is at right angles to the object path. This may not always be possible, or in turn might cause the laser beams to collide with other (unspecified) objects within the field of view of the instrument, causing unwanted backscatter of laser light into the instrument.

SUMMARY OF THE INVENTION

According to a first aspect of the present invention there is provided a method of detecting the velocity of a moving object comprising the steps of: passing a beam of coherent light through an optical mask having a pattern of alternating opaque and non-opaque regions formed thereon, whereby an image of alternating light and dark fringes is projected along the light beam; causing the moving object to pass through the projected image such that a portion of the light beam is reflected from the moving object as a series of pulses; detecting the reflected light pulses and the frequency of the pulses; and calculating the velocity of the object as a function of the pulse frequency and the known separation of the fringes of the image.

The light beam may be brought to an initial focus and the optical mask is located at or prior to the point of the initial focus. Additionally or alternatively, the optical mask may be moveable along the axis of the light beam and or rotationally adjustable about the axis of the light beam. The optical mask may comprises a pattern of equally or unequally spaced lines.

According to a second aspect of the present invention there is provided apparatus for detecting the velocity of a moving object comprising: a coherent light source arranged to generate a beam of coherent light; an optical mask having a pattern of alternating opaque and non-opaque regions formed thereon and being arranged such that the light beam passes through the mask causing an image of alternating light and dark fringes to be projected along the light beam; and a light detector arranged to receive light reflected from a moving object passing through the projected image and to detect the frequency of pulses of reflected light, the pulse frequency being indicative of the velocity of the moving object.

A first lens assembly may be arranged to focus the light beam to an area of focus, wherein the optical mask is located between the first lens assembly and the area of focus. The optical mask may further be arranged to be moveable along the axis of the light beam and additionally or alternatively may arranged to be rotationally adjustable about the axis at the light beam.

The light detector may comprise a light sensor and a second lens assembly having an acceptance volume and arranged to focus light reflected within the acceptance volume onto the light sensor. Furthermore, the orientation of the light detector relative to the light beam may be adjustable.

The optical mask may comprise a pattern of equally or unequally spaced lines. The coherent light source is preferably a laser generator.

BRIEF DESCRIPTION OF THE DRAWINGS

A velocity detector according to embodiments of the present invention will now be described, by way of illustrative example only, with reference to the accompanying drawings, in which.

DESCRIPTION OF THE INVENTION

Figure 1:
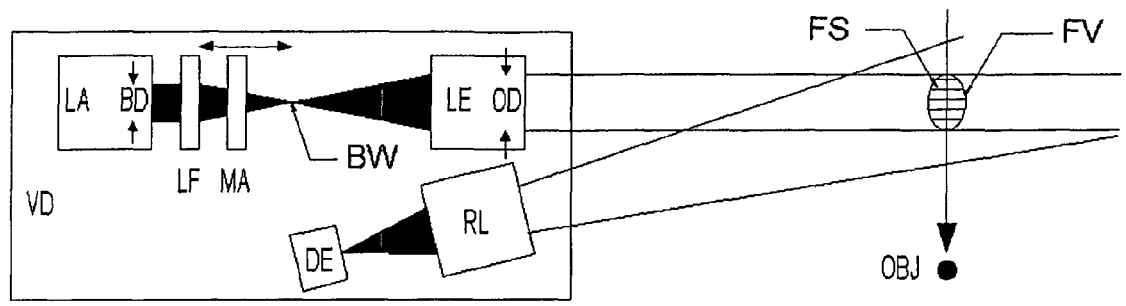
FIG. 1 is a diagrammatic representation of velocity detector according to an embodiment of the present invention as an object passes through a defined field of view.
Figure 2:
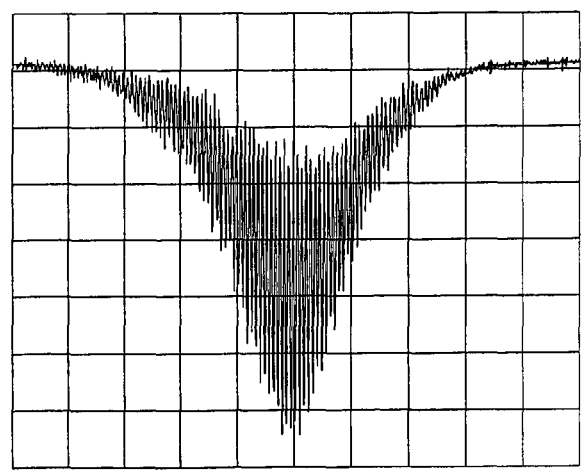
FIG. 2 schematically illustrates an example of the signal generated by an object passing through the measurement volume of the velocity detector of FIG. 1.
Figure 3:
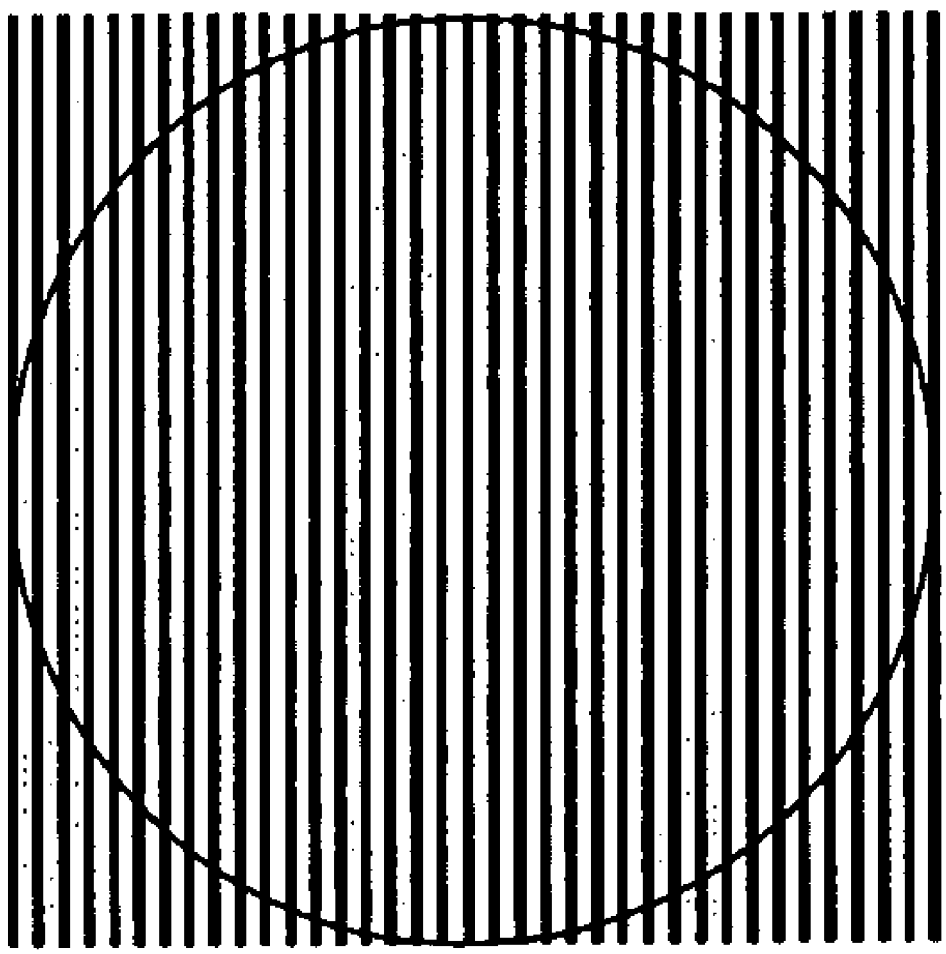
FIG. 3 shows one of a number of possible patterns printed onto a mask for use with the velocity detector of FIG. 1.

A velocity detector according to an embodiment of the present invention is schematically illustrated in FIG. 1. The velocity detector VD has a defined field of view FV and comprises a laser assembly LA producing a converging beam with an initial diameter BD that passes through a mask assembly MA comprising, for example, a pattern of opaque lines deposited onto a glass substrate, as illustrated in FIG. 3. The mask pattern modulates the laser beam which is then refocussed by a lens assembly LE back to a parallel output beam with a beam diameter OD. This output beam will project the image of the mask throughout its length, such image being a pattern of light and dark "fringes". An object passing through the output beam will reflect light from the fringes FS in a series of pulses as it passes through each light fringe, the pulses being at a frequency determined by the object velocity and the fringe pattern. The reflected light is detected by an opto-electronic detector assembly DE having a receiving lens RL and capable of being directed and focussed onto the path of an object OBJ passing through the beam, the defined field of view FV being created by the intersection of the output beam and the acceptance volume of the receiving lens RL. The frequency of the detected pulses can thus be used to derive the velocity of the moving object, i.e. the velocity is given by frequency÷velocity constant.

The laser assembly LA has a focussing means LF which allows the laser beam to be convergent at a point BW known as the "beam waist", the minimum diameter of which is a defined characteristic of the laser light at a given wavelength and known beam geometry. The mask assembly MA is mounted in a mask carrier which allows the mask to be rotated relative to the principal axis of the laser beam and moved to occupy any position between the laser output aperture and the beam waist.

Moving the mask carrier both in rotation and position allows the orientation of the fringes to change and also the number of fringes which will appear in the output beam to change. The lens assembly LE is focussed on its input side onto the surface of the mask assembly holding the defined pattern, and on its output side, creates a collimated output beam with diameter OD. By a combination of adjustments and selected positions of the laser focussing means LF, the laser output aperture BD, the mask assembly MA and the lens assembly LE a defined pattern of light and dark "fringes" FS in a variety of orientations, size and scaling can be projected into the output beam.

An object OBJ passing through the field of view FV will reflect laser light from the fringes FS back to the receiver lens RL. The physical surface characteristics of the object, and principally its roughness, will in part determine the amount of modulated light reflected. The ability of the instrument to readily change the fringe parameters by movement and rotation of the mask MA will allow a better match with a given object, and by so doing, will maximise the depth of modulation of the returned signal.

The receiver assembly comprising lens RL and detector DE may also be rotated about a fixed point in order to align the principal axis of lens RL with a point on the laser beam through which any object might pass, thereby maximising the returned signal from the object to detector DE. It will be appreciated by those skilled in the art that other detection schemes and arrangements may be employed. For example, an arrangement utilising a detector without the requirement for a receiving lens RL may be employed in further embodiments of the present invention.

This invention allows the generation of optical fringes within a measurement volume in a manner which does not rely on the precise manipulation of the crossing point and focussing of laser beams into a defined position, and also optionally allows the orientation of the fringes to be changed without having to rotate the entire instrument. Furthermore, the measurement volume length is not restricted to the crossing point of two laser beams, thereby allowing measurement of objects passing on a plane. Finally, the fringe spacing (and hence the fringe passing frequency) is not determined by interference effects, and can therefore be chosen to best suit the application at hand.

This variability of fringe parameters will allow the use of velocimetry techniques in a very wide range of applications, with velocities ranging from quite slow (mm/sec) to very, very high (km/sec) using detector bandwidth figures in a more economic range than is possible with conventional LDV systems using interference fringe generation. For example, a measurement volume diameter of 5 mm having 20 fringes will have a velocity constant of 4 kHz/metre/sec. With a detector bandwidth of 10 MHz, this would allow velocities of 2,500 meters/second to be measured, compared with 44 meters/sec for the same detector in the conventional crossed beam velocimeter.

When the mask assembly MA is printed with a regular pattern of parallel lines, as illustrated in FIG. 3, the gaps between the lines can be considered to be a series of "slits". It is well known that light passing through a narrow slit creates a diffraction pattern, with an expanding wavefront centred on the slit and with a period determined by the wavelength of the light. When light passes through more than one parallel slit and those slits are adjacent (in relative terms), the wavefronts from each slit interact with each other, adding and subtracting, and in a manner which is determined by the slit spacing. This phenomenon creates light and dark "fringes" across the wavefronts. However, as this is exactly the effect required in the invention, the optical components and laser beam can be adjusted so as to ensure that any diffraction effects are actually added to the masking effect of the slit, and the two independent sets of fringes effectively superimpose, thereby enhancing the efficiency of the technique. Alternately, the optical components and laser beam can be adjusted to eliminate or greatly reduce any diffraction effects, allowing the mask alone to generate the projected pattern. The use of laser light at a tightly defined wavelength and with a high degree of spatial and temporal coherence ensures that the quality of the fringe pattern generated is very high, both in geometric regularity and in light-to-dark contrast.

This method of producing fringes in a measurement volume can be implemented in a number of configurations, for example with either divergent or convergent laser beams, depending on the laser beam diameter and the diameter required for the final measurement volume, or with a parallel laser beam, and with any configuration of lenses to produce the required fringes at a given working distance from the instrument. Additionally, the mask assembly MA may be printed with other patterns, such as a series of concentric circles, that produces light and dark 'fringes', depending upon the desired application and measurements to be taken.

The invention claimed is:

1. A method of detecting the velocity of a moving object comprising the steps of:
    passing a beam of convergent or divergent coherent light through an optical mask having a pattern of alternating opaque and non-opaque regions formed thereon, whereby an image of alternating light and dark fringes is projected along the entire coherence length of the light beam and whereby the mask is positioned within the beam of coherent light so as to eliminate, reduce or incorporate into the resulting image any diffraction effects;
    causing the moving object to pass through the projected image such that a portion of the light beam is reflected from the moving object as a series of pulses;
    detecting the pulses and the pulse frequency;
    and calculating the velocity of the object as a function of the pulse frequency and the known separation of the fringes of the image.

2. The method of claim 1, wherein the light beam is brought to an initial focus and the optical mask is located at or prior to the point of the initial focus.

3. The method of claim 2, wherein the optical mask is moveable along the axis of the light beam.

4. The method of claim 1, wherein the optical mask is rotationally adjustable about the axis of the light beam.

5. The method of claim 1, wherein the optical mask comprises a pattern of equally spaced lines.

6. The method of claim 1, wherein the optical mask comprises a pattern of unequally spaced lines.

7. Apparatus for detecting the velocity of a moving object comprising:
    a coherent light source arranged to generate a convergent or divergent beam of coherent light;
    an optical mask having a pattern of alternating opaque and non-opaque regions formed thereon and being positioned within the beam of coherent light so as to eliminate, reduce or incorporate into the resulting image any diffraction effects and arranged such that the light beam passes through the mask causing an image of alternating light and dark fringes to be projected along the entire coherence length of the light beam; and
    a light detector arranged to receive light reflected from a moving object passing through the projected image and to detect the pulse frequency of reflected light, the pulse frequency being indicative of the velocity of the moving object.

8. The apparatus of claim 7, further comprising a first lens assembly arranged to focus the light beam to an area of focus, wherein the optical mask is located between the first lens assembly and the area of focus.

9. The apparatus of claim 8, wherein the optical mask is arranged to be moveable along the axis of the light beam.

10. The apparatus of claim 8, wherein the optical mask is arranged to be rotationally adjustable about the axis at the light beam.

11. The apparatus of claim 7, wherein the light detector comprises a light sensor and a second lens assembly having an acceptance volume and arranged to focus light reflected within the acceptance volume onto the light sensor.

12. The apparatus of claim 7, wherein the orientation of the light detector relative to the light beam is adjustable.

13. The apparatus of claim 7, wherein the optical mask comprises a pattern of equally spaced lines.

14. The apparatus of claim 7, wherein the optical mask comprises a pattern of unequally spaced lines.

15. The apparatus of claim 7, wherein the coherent light source comprises a laser generator.

* * * * *